US 8,832,739 B2

(12) United States Patent
Raine et al.

(10) Patent No.: US 8,832,739 B2
(45) Date of Patent: Sep. 9, 2014

(54) ONLINE EPG

(75) Inventors: Sarah Raine, Middlesex (GB); Gerrard Anthony O'Sullivan, Middlesex (GB)

(73) Assignee: British Sky Broadcasting Ltd. (GB)

( * ) Notice: Subject to any disclaimer, the term of this patent is extended or adjusted under 35 U.S.C. 154(b) by 461 days.

(21) Appl. No.: 12/809,846

(22) PCT Filed: Dec. 22, 2008

(86) PCT No.: PCT/GB2008/004251
§ 371 (c)(1),
(2), (4) Date: Jan. 28, 2011

(87) PCT Pub. No.: WO2009/081158
PCT Pub. Date: Jul. 2, 2009

(65) Prior Publication Data
US 2011/0113449 A1    May 12, 2011

(30) Foreign Application Priority Data
Dec. 21, 2007    (GB) .................................. 0725088.9

(51) Int. Cl.
  G06F 3/00     (2006.01)
  G06F 13/00    (2006.01)
  H04N 5/445    (2011.01)
(52) U.S. Cl.
  USPC ................... 725/39; 725/40; 725/44; 725/51; 725/52
(58) Field of Classification Search
  USPC ..................... 725/39, 40, 44, 51, 52
  See application file for complete search history.

(56) References Cited

U.S. PATENT DOCUMENTS

| 5,793,438 | A | 8/1998 | Bedard |
| 5,812,124 | A | 9/1998 | Eick et al. |
| 6,421,067 | B1 * | 7/2002 | Kamen et al. ................. 715/719 |
| 6,481,011 | B1 | 11/2002 | Lemmons |
| 6,577,350 | B1 * | 6/2003 | Proehl et al. .................. 348/564 |
| 2004/0017388 | A1 * | 1/2004 | Stautner et al. ............... 345/716 |
| 2004/0250280 | A1 * | 12/2004 | Allport .......................... 725/56 |
| 2006/0117342 | A1 | 6/2006 | Park et al. |
| 2006/0123449 | A1 * | 6/2006 | Ma et al. ......................... 725/58 |
| 2007/0124769 | A1 * | 5/2007 | Casey et al. ..................... 725/46 |
| 2007/0192739 | A1 | 8/2007 | Hunleth et al. |
| 2009/0031343 | A1 * | 1/2009 | Sharkey .......................... 725/39 |
| 2009/0138441 | A1 * | 5/2009 | Valentine et al. ................. 707/3 |

FOREIGN PATENT DOCUMENTS

| CA | 2260894 A1 | 4/2005 |
| CN | 1240554 A | 1/2000 |
| CN | 1321391 A | 11/2001 |
| EP | 1126701 A1 | 8/2001 |
| EP | 1667444 A1 | 6/2006 |

(Continued)

OTHER PUBLICATIONS

Search Report from GB Application No. GB0725088.9 dated Apr. 16, 2008, 3 pages.

(Continued)

Primary Examiner — Hunter B Lonsberry
Assistant Examiner — Tung T Trinh
(74) Attorney, Agent, or Firm — Kilpatrick Townsend & Stockton LLP (57) ABSTRACT

Display features of an interactive user interface for an online environment allow a user to interact with objects and/or information within a display space.

35 Claims, 6 Drawing Sheets

(56) References Cited

FOREIGN PATENT DOCUMENTS

| | | |
|---|---|---|
| EP | 2210416 A2 | 7/2010 |
| WO | WO 98/06219 A1 | 2/1998 |
| WO | WO 98/56176 A1 | 12/1998 |
| WO | 01/20903 A1 | 3/2001 |
| WO | WO 01/20903 A1 | 3/2001 |
| WO | WO 02/37840 A2 | 5/2002 |
| WO | WO 03/054678 A1 | 7/2003 |

OTHER PUBLICATIONS

International Search Report from PCT/GB2008/004251 dated Mar. 11, 2009, 4 pages.

Search Report dated Nov. 16, 2010 for Application No. GB0725088.9, 2 pages.

International Preliminary Report on Patentability and Written Opinion for International PCT Application No. PCT/GB2008/004251, 10 pages.

* cited by examiner

ONLINE EPG

FIELD OF THE INVENTION

The present invention relates to an enhanced interactive electronic programme guide display, and to apparatus, methods and computer programmes for implementing such television displays.

BACKGROUND OF THE INVENTION

In conventional television environments, it is common to provide an electronic programme guide (EPG) as a user interface for the display of television programmes, such as audio and video programmes to the user. Interactive EPGs (IEPGs) allow the user to select programmes for viewing and/or recording. In conventional systems, such as the Sky™ system, a broadcast receiver or set-top box (STB) stores a schedule of programmes to be broadcast on different channels and at different times, and presents the schedule to the user in an IEPG. However, IEPGs are typically designed for display on a television (TV) screen and are therefore limited by processor power and programming flexibility. It is therefore desirable to provide for an enhanced EPG for displaying a schedule of programmes in an alternate environment, such as on a personal computer (PC) or a portable computing device.

Within the PC environment, there is typically more processing power and display resolution capability compared to that provided with conventional set-top boxes. With the increased amount of information that can be processed and displayed, there is a need for an enhanced IEPG display to manage the display of the greater amount of information to provide an efficient and uncomplicated user interface.

STATEMENTS OF THE INVENTION

According to one aspect of the present invention, there, is provided a method of providing an interactive user interface for display of electronic programme guide data, the method comprising receiving programme scheduling data for a plurality of programmes, and providing a display space for displaying at least a portion of the received programme scheduling data, wherein the display space is displayable at one of at least three levels of zoom in response to a user zoom command.

According to another aspect, the present invention provides a method of providing an interactive user interface for display of electronic programme guide data, the method comprising receiving programme scheduling data for a plurality of programmes, and providing a display space for displaying at least a portion of the received programme scheduling data, wherein the display space comprises a first display screen including a plurality of programme entities, at least one of the programme entities consisting of a programme title, a second display screen including a subset of said plurality of programme entities of the first display screen, at least one of the subset of said plurality of programme entities consisting of a programme title and additional information associated with the programme, and a third display screen consisting of one of said subset of said plurality of programme entities of the second display screen, said one programme entity consisting of a programme title, additional information associated with the programme, and information relating to functionality associated with the programme.

According to another aspect of the present invention, there is provided a method of providing an interactive user interface for display of electronic programme guide data, the method comprising receiving programme scheduling data for a plurality of programmes, and providing a display space for displaying at least a portion of the received programme scheduling data, wherein the display space includes a plurality of user-selectable programme entities, and wherein a subset of the plurality of user-selectable programme entities are highlighted in dependence upon user defined filter criteria.

According to yet another aspect of the present invention, there is provided a method of providing an interactive user interface for display of electronic programme guide data, the method comprising receiving programme scheduling data for a plurality of programmes, and providing a display space for displaying at least a portion of the received programme scheduling data, wherein the display space includes a displayed portion of a grid of user-selectable programme entities, and wherein the displayed portion of the grid is modified in response to a user mouse command to drag the displayed portion of the grid.

Apparatus and/or a computer programme arranged to perform any of the above aspects of the invention may be provided.

BRIEF DESCRIPTION OF THE DRAWINGS

There now follows, by way of example only, a detailed description of preferred embodiments of the present invention in which.

DETAILED DESCRIPTION OF THE EMBODIMENTS

Online EPG System

Figure 1:
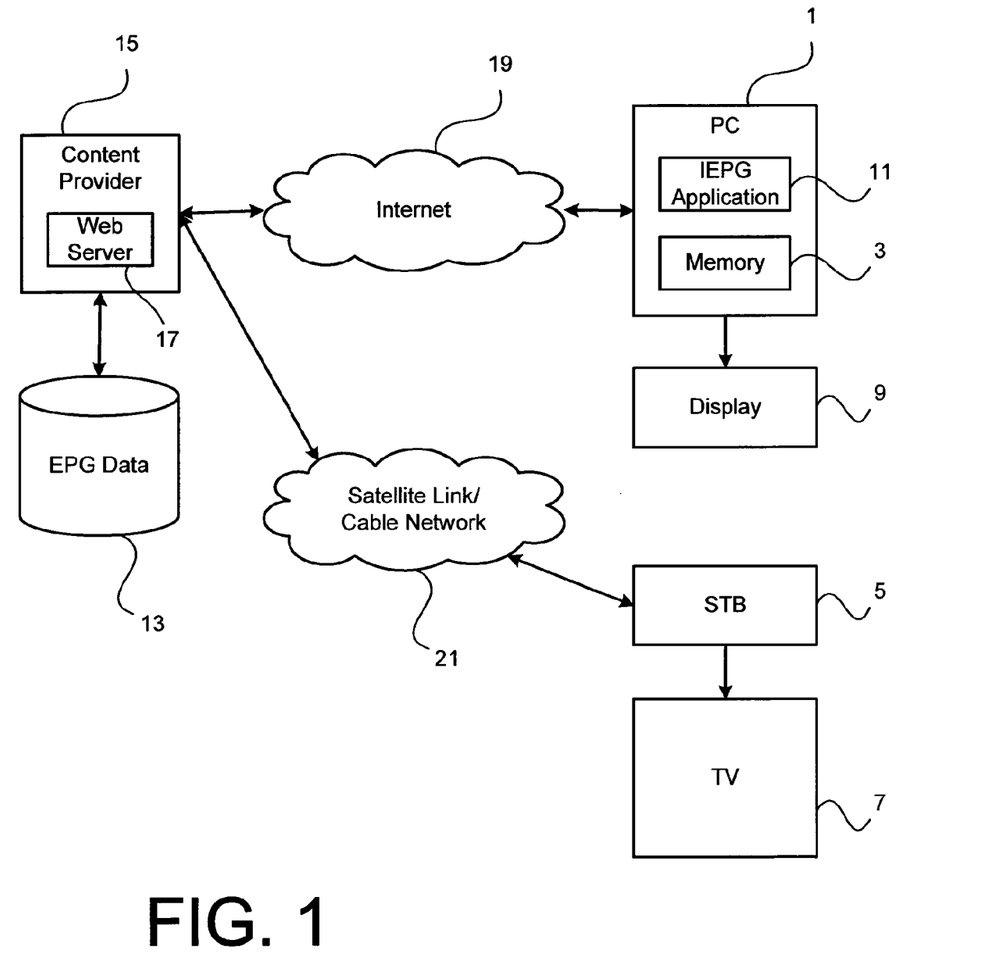
FIG. 1 is a block diagram of the functional components of a system for providing an enhanced IEPG user interface for an online environment.

FIG. 1 is a diagram of the architecture of an enhanced IEPG system in an embodiment of the invention. A PC 1 is arranged to receive and store in memory 3 programme schedule information comprising a schedule of programmes to be broadcast on different channels and at different times, for example to STB 5 for display on TV 7. The programme schedule information is received from a content provider 15 for providing EPG data 13 to the PC 1 via the internet 19. The content provider 15 may include a web server 17 to provide the EPG data 13 as web content to a web browser (not shown) on the PC 1.

The PC 1 includes an IEPG application 11 for providing an enhanced IEPG display for displaying the received programme schedule information, for example on a high resolution display 9. As those skilled in the art will appreciate, the IEPG application 11 may be stored on and executed by the PC 1 in different ways. For example, the IEPG application 11 may be provided as a dedicated enhanced IEPG application stored on the PC 1 for execution by the PC 1. Alternatively, the IEPG application 11 may be provided as a web application or as embedded web content in a web page for display in a web browser on the PC 1.

The content provider 15 may also be arranged to provide programme schedule information to the STB 5 over a satellite link or cable network 21 for conventional display to a user on the TV 7.

EPG Display Embodiments

Embodiments of the invention include novel display features and layouts of an interactive user interface for an online environment, which will now be described below. Those skilled in the art will appreciate that any combination of the display features and layouts described in the following embodiments and alternatives is possible.

Online EPG

Figure 2:
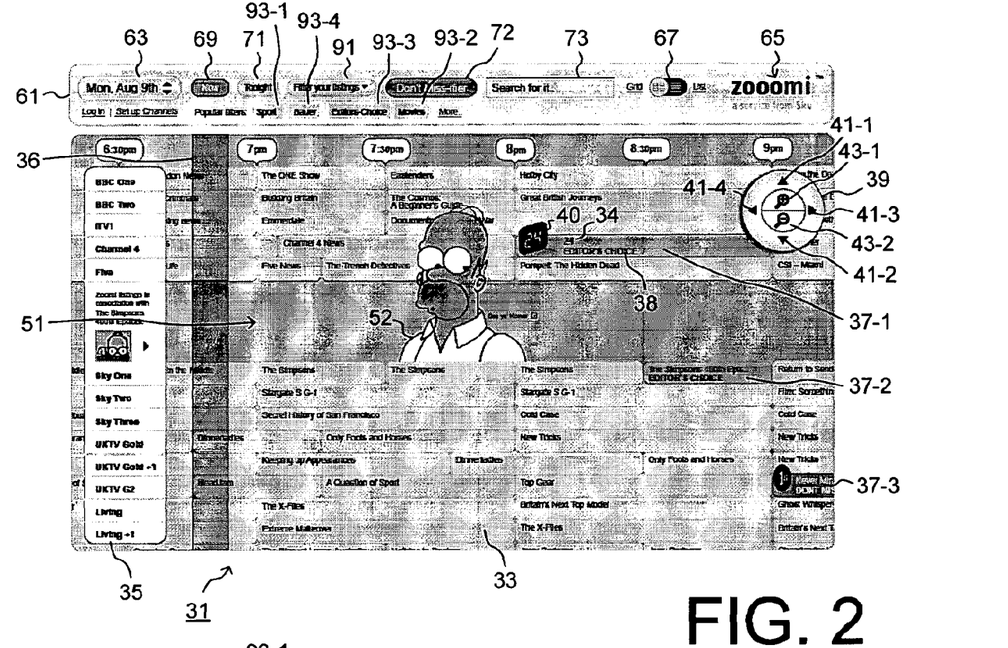
FIG. 2 is an example of an interactive user interface according to an embodiment of the invention.
Figure 3:
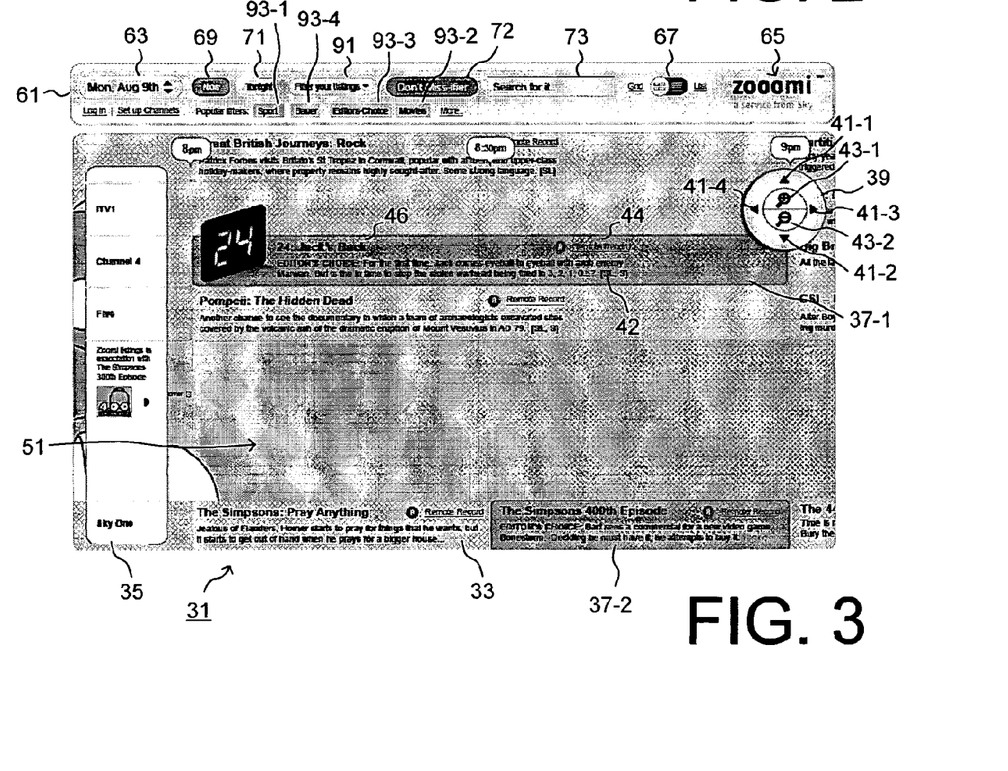
FIG. 3 is another example of the interactive user interface shown in FIG. 2.
Figure 4:
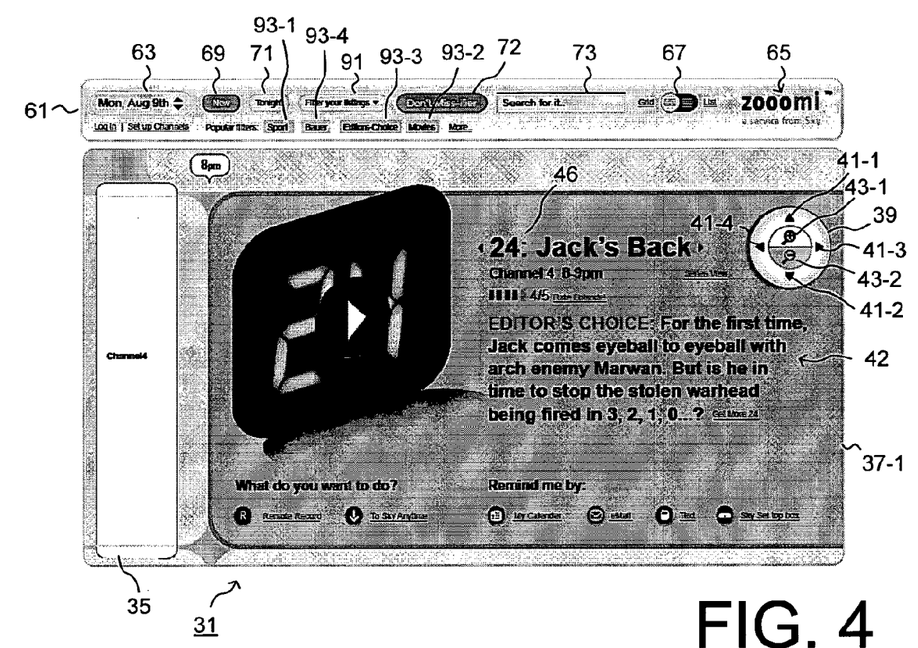
FIG. 4 is another example of the interactive user interface shown in FIGS. 2 and 3.

FIGS. 2, 3 and 4 show an example of an enhanced IEPG display 31 according to a first embodiment of the present invention. According to the present embodiment, three levels of zoom are provided to the user to view varying amounts of information at different zoom-levels. FIG. 2 shows an example of an enhanced IEPG display 31 corresponding to the highest zoom-level view available to the user to provide the user with the greatest number of individual user-selectable programme entities 33 concurrently viewable in the display.

As shown in FIG. 2, the individual user-selectable programme entities 33 are arranged in a grid, with programme times running horizontally along the X axis of the grid, and a scrollable list 35 of different channels running vertically along the Y axis of the grid. In the example shown in FIG. 2, the enhanced IEPG display 31 includes thirteen rows of programme information corresponding to thirteen different channels, over five half-hour time slots providing a two and a half hour window of time. However, the displayed grid of programme entities 33 may extend beyond these dimensions, and the programme entities at the edges of the display 31 may be truncated and only displayed in full when the grid is scrolled in the appropriate direction to bring the programme entity fully into view. As illustrated in FIG. 2, the individual user-selectable programme entities 33 have varying starting times and duration times and therefore may span a portion of a half hour slot, a single half hour time slot or a plurality of half hour time slots. As those skilled in the art will appreciate, the precise dimensions of the grid of programme entities shown in FIG. 2 is provided by way of example of the greater number of channels and time slots that may be displayed in this embodiment compared to conventional IPEG displays of STBs, for example. A greater or lesser number of rows of information and a longer or shorter window of time may be provided at this lowest zoom level.

A line or rectangular region 36 is provided over the displayed grid of programme entities 33 to highlight the programmes which are currently being broadcast on respective displayed channels. The line or rectangular region 36 moves to keep up with the current time. A banner strip 51 may be provided, for example, after every twenty channels or rows of the grid to effectively separate the grid into chunks and to provide a space in the grid for further information to be displayed, such as an advertisement or a particular image 52 associated with an editor's choice as shown in FIG. 2. In such a case, the content image 52 may be aligned within the grid to the associated highlighted programme entity 37-2. Additionally, as illustrated in FIG. 2, the displayed content image 52 may have a display height dimension which is larger than the height of the banner strip 51, such that parts of the adjacent grid elements are obscured by the content image 52. In this way, the content image 52 can be enlarged for ease of viewing.

In this embodiment, at the lowest zoom level, each of the individual user-selectable programme entities 33 displays a title 34 of an associated programme but does not include a description or synopsis of the programme so that the user is presented with a large number of programme entities in a simplified and minimalistic manner to create maximum overview with reduced confusion and information overload. Additionally, if the programme is one episode from a series of programmes, the title displayed at the lowest zoom level may be the programme title without the particular episode title. Alternatively, a subset of the programme entities may include a particular category title preceding the programme title, such as an indication that the programme entity is a film or documentary. As will be described below, the present embodiment advantageously reduces the amount of information displayed for each programme entity at the lowest zoom level and increases the amount of information displayed for each programme entity at each successive increased zoom level.

In this embodiment, a number of highlighted programme entities 37 are shown having a darker shaded background. For example, highlighted programme entities 37-1 and 37-2 include a label 38 after the displayed title to indicate that the programme has been pre-selected as an editor's choice. Highlighted programme entity 37-3 includes a label after the displayed programme title to indicate that the associated programme is a programme to be broadcast that day on a particular channel which is highly recommended. Furthermore, the highlighted programme entities 37-1, 37-3 may include a picture or icon 40 displayed adjacent the programme title to further highlight and emphasise the programme entity.

The enhanced IEPG display 31 also includes a navigation tool 39 which allows the user to navigate throughout the grid of programme entities 33. The navigation tool 39 includes directional arrows 41 which the user can press to scroll through rows of programme information for different channels or through earlier or later time slots in the displayed grid. For example, the user may press the up directional arrow 41-1 or the down directional arrow 41-2 to scroll through the list 35 of broadcast channels displayed along the Y axis of the grid. The user may also press the right directional arrow button in 41-3 or the left directional arrow button 41-4 to scroll the grid in the horizontal direction to view later or earlier broadcast programmes. Finally, the navigation tool 39 provides a zoom-in button 43-1 and a zoom-out button 43-2 to allow the user to change the zoom level of the display grid, as will be described below. In the example display screen shown in FIG. 2, the user is viewing the lowest zoom level and therefore the zoom-out button 43-2 may be displayed as a disabled button to indicate that no lower zoom level is available.

FIG. 3 shows an example of the enhanced IEPG display 31 corresponding to a middle zoom view which is displayed when the user presses the zoom-in button 43-1 from the lowest zoom level view shown in FIG. 2. As shown in FIG. 3, fewer rows of programme channels are displayed and just a one hour time window in displayed at this middle zoom view. Additionally, each of the user-selectable programme entities 33 is displayed at a larger size and scale and additional information is displayed within each of the enlarged user-selectable programme entities 33. In particular, a brief description or synopsis 42 of the programme is displayed below the programme title as well as a link or button 44 to allow the user to issue a remote record instruction for a particular program, as will be described below. In the middle zoom level view, the programme title may also include the episode title 46 in addition to the programme title for programmes which are part of a series of programmes.

The navigation tool 39 is also provided in the middle zoom view shown in FIG. 3 to allow the user to scroll the displayed grid of programme entities 33, in the same way as discussed above. The user may also press the zoom-out button 43-2 to return to the lowest zoom level view shown in FIG. 2.

Alternatively, the user may zoom in to the highest zoom level view by pressing the zoom-in button 43-1 to view information associated with a single programme entity, as shown in FIG. 4. In this highest zoom level view, a single programme entity is displayed, in this example the highlighted programme entity 37-1 associated with the editor's choice programme "24" and the episode entitled "Jack's Back". As shown in FIG. 4, the enlarged highlighted programme entity 37-1 displays an even greater amount of information compared to the previous zoom level displays of FIGS. 2 and 3. For example, the highlighted programme entity 37-1 displays full channel and time information for the associated program, a user rating associated with the program, links or buttons to display further information related to the program such as a series view of other episodes in the series or more information regarding the episode, and buttons to issue various forms of reminder such as adding an entry to an external calendar application, sending an email reminder, a text reminder or storing a reminder on the user's associated set-top box. The user is also provided with a number of recording options, as will be discussed in more detail below.

The navigation tool 39 is also provided at the highest zoom level view to allow the user to scroll to adjacent individual programme entities 33 using the directional arrow buttons 41 or to zoom back out to the middle zoom level view of FIG. 3 by pressing the zoom-out button 43-2, in the same way as described above. As discussed above, the zoom-in button 43-1 may be disabled and displayed, for example, as a shaded button to indicate that the user is unable to zoom in any further.

Although navigation within and throughout the enhanced IEPG display 31 is described above using the navigation tool 39, those skilled in the art will appreciate that additional means of navigation may be provided to the user, for example, the user may effect a zoom-in operation to a higher zoom level view by selecting a particular programme entity 33. Alternatively or additionally, the user may effect zooming-in and zooming-out between zoom levels by double clicking a button or using a mouse wheel of an appropriate mouse input device. Furthermore, instead of using the directional arrow buttons 41 on the navigation tool 39, the user may instead use a mouse input device to issue a drag command with the mouse cursor anywhere on the displayed grid and to drag the displayed grid in any direction to scroll to a row of programme entities for a desired channel or to a desired time slot.

Search

Referring again to FIG. 2, the illustrated enhanced IEPG display 31 includes a header portion 61 for providing additional information to the user and providing additional user interface functionality. As shown in FIG. 2, the header portion 61 includes a date display 63, a logo or branding image 65, and a display view button 67 to toggle between the grid view shown in FIG. 2 and an alternative list view of the programme entities (not shown). The date display 63 may be provided as a button for the user to jump to programme schedule information from a different day. The header portion 61 also includes a button labelled "Now" 69 to allow the user to issue a command to jump or immediately scroll to the current time and display the programmes currently being broadcast for the displayed channels in the channel list 35. A button labelled "Tonight" 71 may be provided to allow the user to jump to programmes starting at a predefined time that the user may be interested in, for example, at 9 pm. A further button labelled "Don't Miss-ifier" 72 may be provided to allow the user to issue a command to jump to a particular programme which is highlighted as a highly recommended programme 37-3 on a particular channel.

Figure 5:
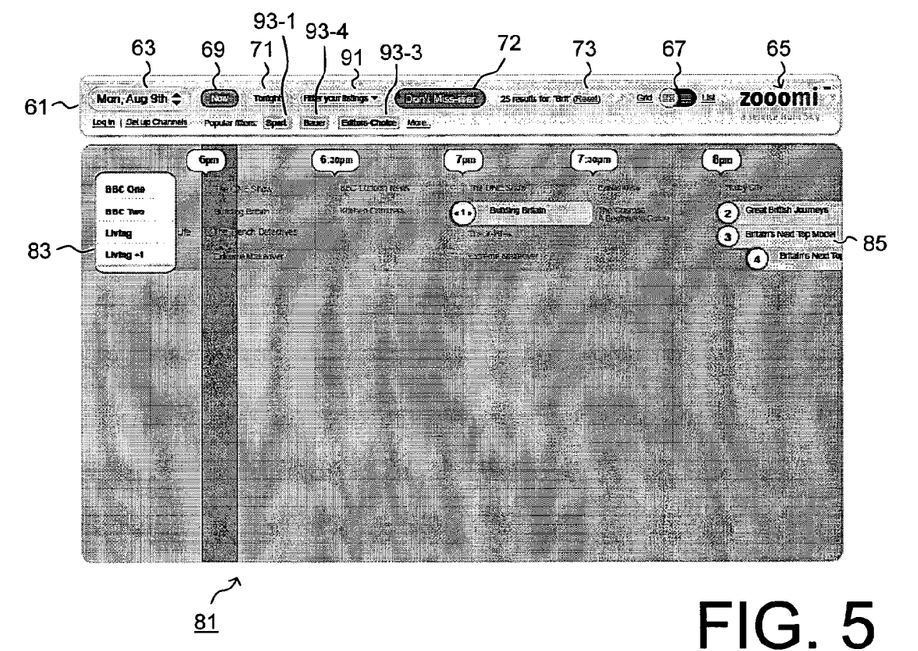
FIG. 5 is another example of an interactive user interface according to an embodiment of the invention.

The header portion 61 includes a text entry box to allow the user to enter one or more search terms to search for particular programme entities in the EPG programme scheduling data. As shown in FIG. 2, the search input box 73 initially provides a prompt to the user to enter a search term, for example by providing the text "Search for it . . . ". Once the user has entered a search query, a search is conducted to identify all programme entities in the EPG data which match the search query. FIG. 5 is an example of the search result screen according to an embodiment of the present invention. The enhanced IEPG display 81 shown in FIG. 5 is similar to the display 31 shown in FIG. 2 except that the display grid only shows those channels which include at least one of the search results, and the search input box 73 in the header portion 61 has been replaced with an indication of the number of search results matching the input search query, in this case twenty five results for the search query "Brit". As shown in FIG. 5, the search results are displayed as highlighted programme entities in the grid, and in this embodiment, the remaining programme entities which do not match the search result are displayed in a faded manner so as to further emphasise the search results.

The grid of search results can be navigated in the same way as described above.

Filtering

Figure 6:
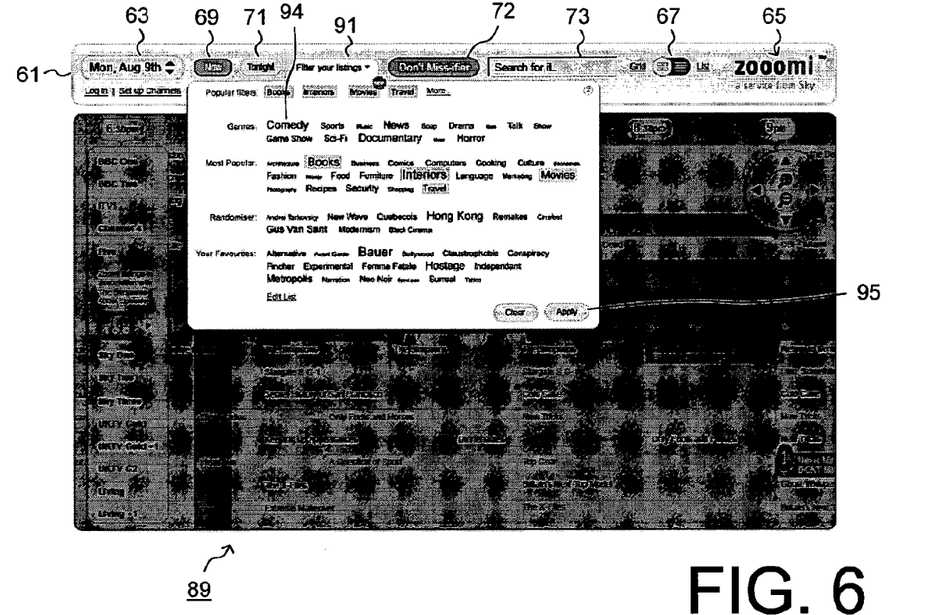
FIG. 6 is another example of an interactive user interface according to an embodiment of the invention.

In an embodiment, the header portion 61 shown in FIG. 2 includes a button 91 labelled "Filter your listings" which provides the user with a further functionality to filter the displayed grid of programme entities according to user selected filter criteria. A number of predetermined popular filters are provided in the header portion 61, for example to filter the displayed EPG data to highlight programme entities associated with the sport genre 91-1 or the movie genre 93-2, and/or to highlight programme entities labelled as editor's choice 93-3 or a user specified filter "Bauer" 93-4. As shown in FIG. 6, the user may press the filter button 91 to display a popup menu dialogue window listing additional user-selectable filter criteria 94. In this embodiment, each of the listed filter criteria is provided as a word tag with user selected criteria highlighted to indicate that a selected filter will be applied to the enhanced IEPG display 31.

In this embodiment, the font size of each particular filter criteria word tag may vary depending on a predetermined parameter, such as user popularity of the respective filter criteria, with larger font sizes being indicative of more popular filter criteria. Once the user has selected the desired filter criteria, the filter criteria are applied to the enhanced IEPG display 31 in response to the user pressing an "Apply" button 95.

Figure 7:
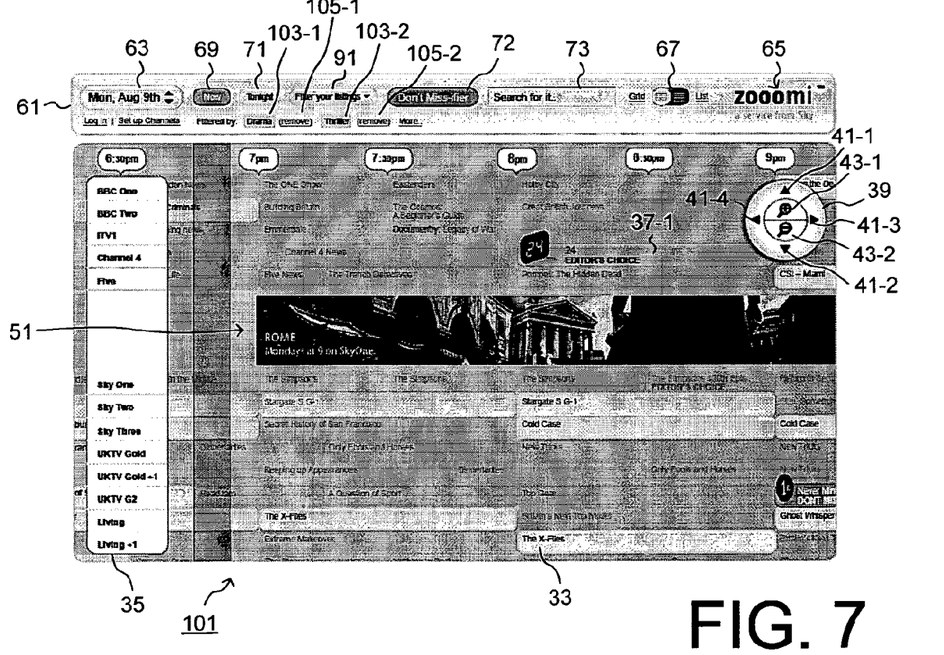
FIG. 7 is another example of the interactive user interface shown in FIG. 6.

FIG. 7 shows an example of an enhanced IEPG display 101 similar to the one shown in FIG. 2, except that two filter criteria have been applied to the display. In the example shown in FIG. 7, the filter criteria applied are to highlight programme entities 33 associated with the drama genre and the thriller genre. A link or button 103 is provided adjacent to each of the applied filter criteria 103 so that the user may remove a particular filter criteria. Referring to the grid displayed in the enhanced IEPG display 101, the programme entities that match the applied filter criteria 103 are highlighted. As described above, in this embodiment, highlighting is achieved by displaying the programme entities that do not match the filter criteria in a faded manner such that the non-matching programme entities appear to be knocked back in the display.

Navigation within and throughout the enhanced IEPG display 101 is the same as described above.

Movie Display Window

Figure 8:
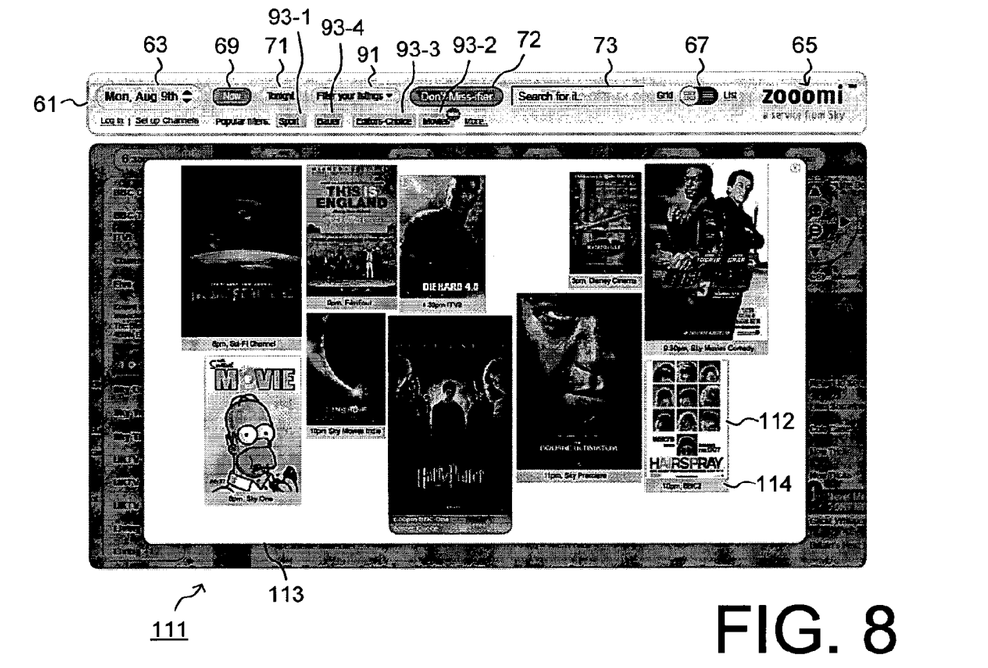
FIG. 8 is another example of an interactive user interface according to an embodiment of the invention.

FIG. 8 shows an example of an enhanced IEPG display 111 in accordance with another embodiment of the present invention. In this embodiment, a popup window 113 is displayed to the user in response to the user selecting an appropriate option, the popup display window 113 in this example displaying a plurality of user-selectable movie entities 115, each entity including an image 112 associated with the movie and an information bar 114 indicating the time and channel that the movie will be broadcast.

Syndication

Figure 9:
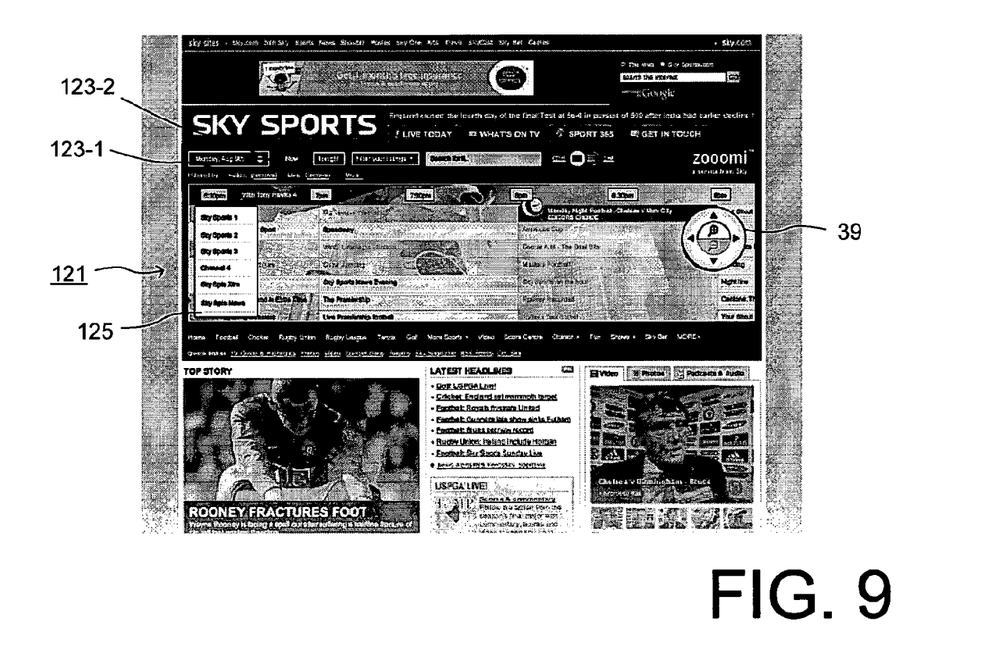
FIG. 9 is another example of an interactive user interface according to an embodiment of the invention.

The above enhanced IEPG display screens have been described in the context of an application executed on a PC 1. FIG. 9 shows an example of an enhanced IEPG display 121 embedded within web page content of an external web content provider, and viewable via for example a web browser on the PC 1. As shown in FIG. 9, the embedded enhanced IEPG display 121 may be configured to display fewer rows of information by displaying only six channels over the two and half hour window of time. Furthermore, the enhanced IEPG display 121 may be pre-configured with one or more relevant filter criteria related to the data content of the associated web site. In the example shown in FIG. 9, the web content is related to sports and therefore the EPG data displayed in the enhanced IEPG display 121 is filtered to display programme entities of the action genre and programme entities which are live broadcast programmes. As discussed above, only those channels having programme entities matching the filter criteria are displayed in the channel list 125. In this way, a fully customisable enhanced IEPG display may be provided within web site content, tailored to display only those programme entities which users of that particular web site are likely to be interested in.

The remaining features, including navigation of the enhanced IEPG display 121, are the same as described above.

Single-Access Management

Referring back to FIG. 2, the header portion 61 of the enhanced IEPG display 31 further includes a button or link labelled "Log in" to allow the user to enter a user name and password to access individual and personal preferences. A link or button labelled "Set up channels" is also provided for the user to set up the channels to match his/her TV subscription. This allows user management of the list of channels 35.

In an alternative embodiment, the user preferences may be stored at the content provider 15 such that the same user preferences may be applied to all network sites displaying an enhanced IEPG display according to the above embodiments. In this way, the user preferences may be applied, for example, to enhanced IEPG displays on a web browser on a PC, a dedicated enhanced IEPG display application on a PC, or similar display on a mobile device such as a suitable mobile telephone.

Remote Record

As discussed above, in the middle and highest zoom level displays shown in FIGS. 3 and 4, the user provided with an option to remotely record a particular program. Operation of a device in providing such remote recording services may be as described in the Applicant's earlier International Patent Application No. PCT/GB06/004918.

Widgets

Figure 10:
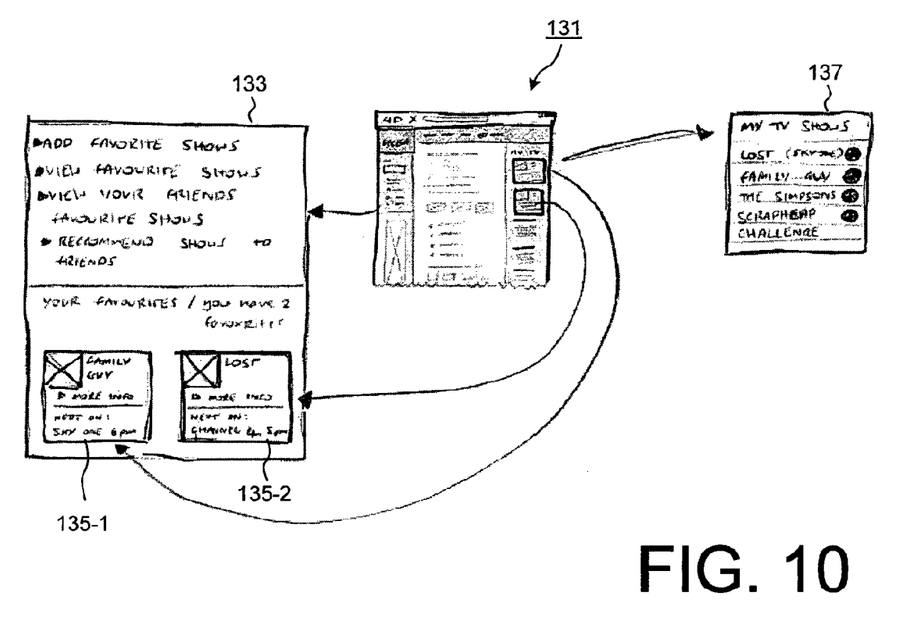
FIG. 10 is a schematic illustration of web page content according to an embodiment of the invention.

FIG. 10 schematically illustrates a web page 131 including TV programme related content, such as listings of a user's favourite shows and links to other user's lists of favourite shows. There are many websites which allow users to customise such personal web content, such as MySpace and Face Book. Such web sites also provide for inclusion of embedded functionality and content by way of, for example, an application plug-in or widget. An example widget 133 is schematically illustrated in FIG. 10, embedded in the left hand side column of the web page 131. The widget 133 includes links providing user functionality to add a favourite show, to view a favourite show, to view a user's friend's favourite shows, and to recommend shows to the user's friends. In a lower portion of the example widget 133, further embedded information is displayed to the user. In this example, two user-selectable programme entities 135-1 and 135-2 are displayed within the widget 133. The user-selectable programme entities 135 may additionally or alternatively be displayed in another part of the web page 131. In such an embodiment, the widget receives the relevant portion of EPG data 13 from the content provider 15 via the Internet 19 for embedding in the respective programme entity 135.

A list 137 of the user's favourite TV shows or programmes may be displayed in response to user pressing the link in the widget 133 to view the user's favourite shows. Each item in the favourite show list 137 may be provided as a link, and in response to a user selecting one of the items on the favourite show list 137, information associated with the programme may be provided to an enhanced IEPG display application as described in the embodiments above, the provided information being used as a filter criteria to the display such that occurrences of the selected favourite show or programme are highlighted in the enhanced IEPG display.

In an alternative, an enhanced IEPG display application according to the above embodiment may be customisable to subscribe to an RSS feed from an appropriate website, such as the favourite TV programme widget discussed above. The RSS feed may provide the enhanced IEPG display application with one or more filter criteria based, for example, on a particular user's indicated favourite programmes. As those skilled in the art will appreciate, a RSS feed is advantageous because the user need not manually update the filter criteria but instead may configure the application to retrieve an appropriate RSS feed at predefined intervals.

Further Alternative Embodiments

The embodiments described above are illustrative of rather than limiting to the present invention. Alternative embodiments apparent on reading the above description may nevertheless fall within the scope of the invention. Embodiments of the present invention include various processors. The processors may be performed by a unit or units such as hardware components or maybe embodied in machine-executable instructions, which may be used to cause one or more processors programmed with the instructions to perform processes. Alternatively, the processes may be performed by a combination of hardware and software. As used in herein, a unit performing a process can be one or more processors, ASIC, a controller such as a micro-controller, and any other module capable of carrying out the processes.

Embodiments of the present invention may be provided as a computer programme product that may include a machine-readable medium having stored thereon instructions, which may be used to programme a computer (or other electronic device) to perform a process according to one or embodiments of the present invention.

The machine-readable medium may include, but is not limited to, floppy diskettes, optical disks, compact disc read-only memories (CD-ROMS), magneto-optical disks, read-only memories (ROMs), random access memories (RAMs), erasable programmable or read-only memories (EPROMs), electrically erasable programmable read-only memories (EE-PROMs), magnetic or optical currents, flash memory, or other type of media/machine-readable medium suitable for storing instructions. Moreover, embodiments of the present invention may also be downloaded as a computer programme product, wherein the programme may be transferred from a remote computer to a requesting computer by way of data signals embodied in a carrier wave or other propagation medium by a communication link (e.g., a modem or network connection).

The above embodiments are presented as separate embodiments but those skilled in the art will appreciate that any combination of the display screens and aspects therein described in the above embodiments and alternatives is possible.

The invention claimed is:

1. A method of providing an interactive user interface for display of electronic programme guide data, the method comprising receiving programme scheduling data for a plurality of programmes, and providing a display space for displaying at least a portion of the received programme scheduling data as a grid of user-selectable programme entities, wherein the display space is displayable at one of at least three levels of zoom in response to a user zoom command with an increasing amount of information displayed within each of a plurality of the programme entities at each successive increased zoom level, and wherein navigation of the displayed grid of user-selectable programme entities is provided at each of said levels of zoom, and wherein the zoom level is displayed with respect to a respective programme entity.

2. The method of claim 1, wherein a first level of zoom displays a grid of user-selectable programme entities for a plurality of broadcast channels over a plurality of time slots.

3. The method of claim 2, wherein a second level of zoom displays a grid of user-selectable programme entities for a plurality of broadcast channels over a plurality of time slots, wherein the number of broadcast channels displayed at the second level of zoom is less than the number of broadcast channels displayed at the first level of zoom, and wherein the number of time slots displayed at the second level of zoom is less than the number of time slots displayed at the first level of zoom.

4. The method of claim 3, wherein a third level of zoom displays a single programme entity of the grid of user-selectable programme entities, and wherein navigation of the displayed grid at the third level of zoom is to an adjacent individual programme entity in the grid.

5. The method of claim 4, wherein at the first level of zoom, each user-selectable programme entity includes a programme title of an associated programme and does not include a programme synopsis.

6. The method of claim 5, wherein at the second level of zoom, each user-selectable programme entity includes a programme title and a programme synopsis of an associated programme.

7. The method of claim 6, wherein at the third level of zoom, each user-selectable programme entity includes the programme title, the programme synopsis and additional information associated with the programme including information relating to functionality associated with the programme.

8. The method of claim 1, wherein a subset of the plurality of user-selectable programme entities are highlighted in dependence upon user defined filter criteria.

9. The method of claim 8, wherein the user inputs filter criteria by selecting filter criteria from a list of available filter criteria.

10. The method of claim 9, wherein the list of available filter criteria includes a plurality of filter criteria, each having a respective display size which depends on an associated parameter.

11. The method of claim 10, wherein the associated parameter is a popularity of the filter criteria.

12. The method of claim 8, wherein the user inputs filter criteria by specifying a particular filter criteria.

13. The method of claim 8, wherein the filter criteria are received from an external source.

14. The method of claim 13, wherein the external source is an Rich Site Summary (RSS) feed.

15. The method of claim 1, wherein the displayed portion of the grid is modified in response to a user mouse command to drag the displayed portion of the grid.

16. The method of claim 1, wherein the display space further includes a content image associated with one of said user-selectable programme entities.

17. The method of claim 16, wherein the content image is displayed over the grid of user-selectable programme entities, such that the content image obscures a portion of the grid of user-selectable programme entities.

18. The method of claim 16 or 17, wherein a plurality of content images are displayed, each associated with one of said user-selectable programme entities.

19. The method of claim 1, the method further comprising providing an interactive user interface embedded in the web content for display in the web browser.

20. The method of claim 19, wherein the interactive user interface embedded in the web content is configured with preset filter criteria for highlighting programme data in the interactive user interface which match the filter criteria.

21. A computer program product embodied on a non-transitory computer-readable storage medium containing computer implementable instructions executable by a computer to perform a method comprising:
receiving programme scheduling data for a plurality of programmes; and
providing a display space for displaying at least a portion of the received programme scheduling data as a grid of user-selectable programme entities;
wherein the display space is displayable at one of at least three levels of zoom in response to a user zoom command with an increasing amount of information displayed within each of a plurality of the programme entities at each successive increased zoom level, and wherein navigation of the displayed grid of user-selectable programme entities is provided at each of said levels of zoom; and
wherein the zoom level is displayed with respect to a respective programme entity.

22. The computer program product of claim 21, wherein a first level of zoom displays a grid of user-selectable programme entities for a plurality of broadcast channels over a plurality of time slots.

23. The computer program product of claim 22, wherein a second level of zoom displays a grid of user-selectable programme entities for a plurality of broadcast channels over a plurality of time slots, wherein the number of broadcast channels displayed at the second level of zoom is less than the number of broadcast channels displayed at the first level of zoom, and wherein the number of time slots displayed at the second level of zoom is less than the number of time slots displayed at the first level of zoom.

24. The computer program product of claim 23, wherein a third level of zoom displays single programme entity of the a grid of user-selectable programme entities, and wherein navigation of the displayed grid at the third level of zoom is to an adjacent individual programme entity in the grid.

25. The computer program product of claim 24, wherein at the first level of zoom, each user-selectable programme entity includes a programme title of an associated programme and does not include a programme synopsis.

26. The computer program product of claim 25, wherein at the second level of zoom, each user-selectable programme entity includes a programme title and a programme synopsis of an associated programme.

27. The computer program product of claim 21, wherein the display space provided by the computer comprises:
   a first display screen including a plurality of programme entities, at least one of the programme entities consisting of a programme title;
   a second display screen including a subset of said plurality of programme entities of the first display screen, at least one of the subset of said plurality of programme entities consisting of a programme title and additional information associated with the programme; and
   a third display screen consisting of one of said subset of said plurality of programme entities of the second display screen, said one programme entity consisting of a programme title, additional information associated with the programme, and information relating to functionality associated with the programme.

28. A media system comprising:
   a memory that receives programme scheduling data for a plurality of programmes; and
   a processor that is operable to provide a display space for displaying at least a portion of the received programme scheduling data as a grid of user-selectable programme entities;
   wherein the display space is displayable at one of at least three levels of zoom in response to a user zoom command with an increasing amount of information displayed within each of a plurality of the programme entities at each successive increased zoom level, and wherein navigation of the displayed grid of user-selectable programme entities is provided at each of said levels of zoom and
   wherein the zoom level is displayed with respect to a respective programme entity.

29. The media system of claim 28, wherein the display space provided by the processor comprises:
   a first display screen including a plurality of programme entities, at least one of the programme entities consisting of a programme title;
   a second display screen including a subset of said plurality of programme entities of the first display screen, at least one of the subset of said plurality of programme entities consisting of a programme title and additional information associated with the programme; and
   a third display screen consisting of one of said subset of said plurality of programme entities of the second display screen, said one programme entity consisting of a programme title, additional information associated with the programme, and information relating to functionality associated with the programme.

30. The media system of claim 28, wherein the lowest level of zoom provides a remote recording feature.

31. The media system of claim 28, wherein the detail information displayed is increased in the second level of zoom as compared to the first level of zoom, in response to selection of zoom in the display of the first level of zoom.

32. The computer program product of claim 21, wherein the lowest level of zoom provides a remote recording feature.

33. The computer program product of claim 21, wherein the detail information displayed is increased in the second level of zoom as compared to the first level of zoom, in response to selection of zoom in the display of the first level of zoom.

34. The method of claim 1, wherein the lowest level of zoom provides a remote recording feature.

35. The method of claim 1, wherein the detail information displayed is increased in the second level of zoom as compared to the first level of zoom, in response to selection of zoom in the display of the first level of zoom.

* * * * *